United States Patent [19]

Fujisaki et al.

[11] Patent Number: 4,955,055
[45] Date of Patent: Sep. 4, 1990

[54] LOUDSPEAKING TELEPHONE WITH A FREQUENCY SHIFTING CIRCUIT

[75] Inventors: Hisashi Fujisaki; Keiko Shimada, both of Tokyo, Japan

[73] Assignee: NEC Corporation, Japan

[21] Appl. No.: 165,629

[22] Filed: Mar. 8, 1988

[30] Foreign Application Priority Data

Mar. 12, 1987 [JP] Japan .................................. 62-55129

[51] Int. Cl.⁵ ............................................ H04M 9/08
[52] U.S. Cl. ..................................... 379/390; 379/388; 381/94
[58] Field of Search ............... 379/388, 390, 391, 392, 379/395, 406, 409; 381/83, 93, 94; 370/30, 32

[56] References Cited

U.S. PATENT DOCUMENTS

| | | | |
|---|---|---|---|
| 3,257,510 | 6/1966 | Burkhard | 381/93 |
| 3,894,187 | 7/1975 | Shibata et al. | 379/390 |
| 3,952,166 | 4/1976 | Kato et al. | 379/390 |
| 4,641,339 | 2/1987 | Stottlemyer | 379/409 |
| 4,689,818 | 8/1987 | Ammitzboll | 381/93 |
| 4,748,663 | 5/1988 | Phillips et al. | 379/388 |
| 4,819,263 | 4/1989 | Franklin | 379/390 |

FOREIGN PATENT DOCUMENTS

| | | | |
|---|---|---|---|
| 3624764 | 1/1988 | Fed. Rep. of Germany | 381/93 |
| 0202532 | 9/1986 | Japan | 379/406 |
| 1597501 | 9/1981 | United Kingdom | 381/93 |

OTHER PUBLICATIONS

The 4A Speakerphone-Hands-Down Winner, Bell Laboratories Record, pp. 233-237, Sep. 1973.
Functional Design of a Voice-Switched Speakerphone, The Bell System Technical Journal, pp. 649-668, May 1961.
Fundamental Considerations in the Design of a Voice-Switched Speakerphone, The Bell System Technical Journal, pp. 265-293, Mar. 1960.
Loudspeaking Telephone Circuit, U.S. Pat. No. 3,952,166.
T. Brook; "A Frequency Shifter for Public Address Systems"; Electronics Australia; vol. 37, No. 5; Aug. 1975; pp. 54, 55, 57, 59.

Primary Examiner—Jin F. Ng
Assistant Examiner—Randall P. Myers
Attorney, Agent, or Firm—Laff, Whitesel, Conte & Saret

[57] ABSTRACT

A loud speaking telephone has separate volume level control circuits positioned in the transmit and receive paths, respectively. The frequency is shifted in at least one of the paths to provide a signal which is less likely to produce echos or singing. A comparator compares the levels in the send and receive paths to produce a control signal. The control signal adjusts the volume level controls to prevent singing.

4 Claims, 3 Drawing Sheets

LOUDSPEAKING TELEPHONE WITH A FREQUENCY SHIFTING CIRCUIT

BACKGROUND OF THE INVENTION

The present invention relates to a loudspeaking telephone for providing hands-free communication and, more particularly, to a voice-switched loudspeaking telephone which controls the gain of transmitting and receiving paths by comparing the level of a transmitting path signal (a signal to be transmitted on a transmitting path) and the level of a receiving path signal (a signal received on a receiving path).

In a telephone of the type described, a sending voice signal is inputted through a microphone and is amplified by a microphone amplifier and, then, is applied to a variable loss circuit (variolosser) to be controlled in level. The output of the variolosser is fed out to, for example, a subscriber line via an output amplifier and a hybrid circuit.

On the other hand, a receiving speech signal from the subscriber line is routed through the hybrid circuit and an input amplifier and, then, is controlled in level by a variolosser which independent of the previously mentioned one. The output of this variolosser is amplified by a speaker amplifier, and, then outputted through a loudspeaker as the sound of a received voice signal. The input to the variolosser on the input side and the output from the variolosser on the output side, i.e., the outgoing and incoming signals, are compared by a level comparator with respect to their level. Based on the result of this comparison, the level comparator controls the amount of insertion loss to be effected by the variolossers which are respectively located on the input side and the output side. The amounts of the insertion loss should be large enough to prevent "singing", as described hereunder.

In the above example, a balance network is installed for the impedance balancing of the hybrid circuit. In practice, however, a certain amount of runaround occurs from the transmitting path to the receiving path, i.e., sidetone coupling. In addition, the received voice which signal is outputted through the loudspeaker is coupled to the microphone, an occurrence generally referred to as acoustic coupling.

It follows that, when the amount of insertion loss introduced by the variolosser is reduced on the transmitting and receiving paths, the probability is increased that the gain becomes greater than 1 in the loop which extends from the microphone and back to the the microphone via the hybrid circuit and the speaker, thus causing singing.

To prevent such singing, the gain on one or both of the transmitting and receiving paths is reduced to a level that is lower than the levels which are particular to the each path. The amount of decrease in gain, i.e., the amount of insertion loss in the variolosser, depends upon the amount of acoustic coupling and of sidetone coupling. Generally, the amount of acoustic coupling involves substantial peaks and dips with respect to the frequency characteristic and noticeably fluctuates depending upon the environment in which the telephone is situated. Hence, the insertion loss should be great enough to guarantee stable operation while preventing singing. This signing prevents a two-way communication from being held smoothly.

With respect to the details of the above-described telephone, reference may be made to the following literature:

(1) The 4A Speakerphone-Hands-Down Winner, Bell Laboratories Record, pp. 233–237, Sept. 1973
(2) Functional Design of a Voice-Switched Speakerphone, The Bell System Technical Journal, pp. 649–668, May 1961
(3) Fundamental Considerations in the Design of a Voice-Switched Speakerphone, The Bell System Technical Journal, pp. 265–293, Mar. 1960
(4) Loudspeaking Telephone Circuit, U.S. Pat. No. 3,952,166.

SUMMARY OF THE INVENTION

It is, therefore, an object of the present invention to provide a loudspeaking telephone which is capable of preventing singing without requiring a great insertion loss and, therefore, of promoting smooth two-way communication.

In accordance with the present invention, a loudspeaking telephone comprises first level control means positioned on a transmitting path. A second level control means is positioned on a receiving path. A frequency shifting means is provided on at least one of the transmitting and receiving paths for shifting the frequencies of at least one of a transmitting path signal and of a receiving path signal. A level comparator means compares the levels of the two path signals to control the first and second level control means.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENTS

Figure 1:
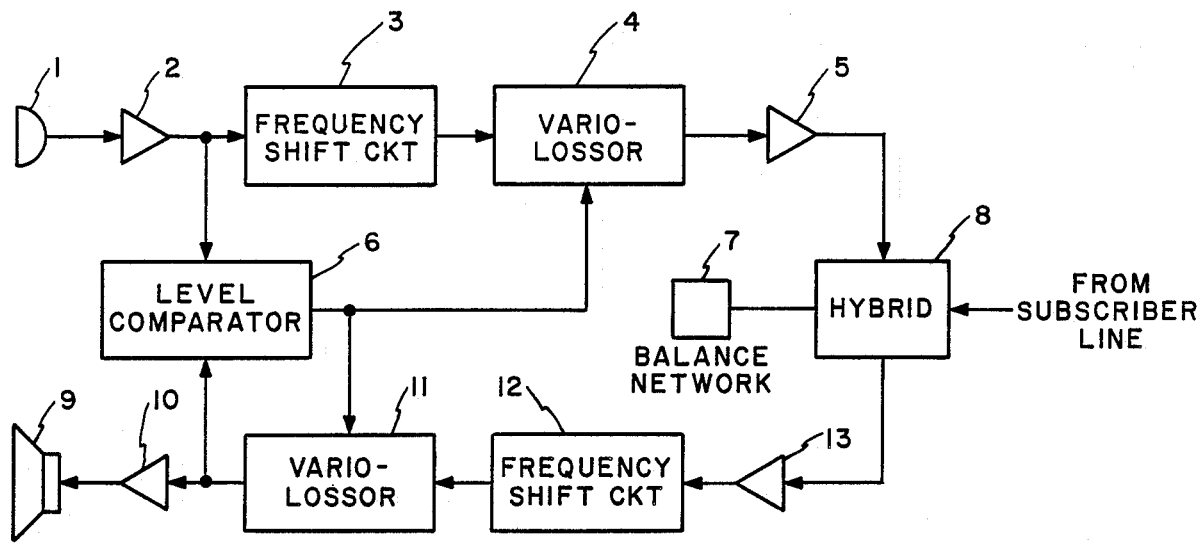
FIG. 1 is a schematic block diagram showing a loudspeaking telephone embodying the present invention.

In FIG. 1, a loudspeaker telephone is a voice-switched type. As shown, a sending voice signal is inputted through a microphone 1, is amplified by a microphone amplifier 2 and, then, is shifted in its frequency by a frequency shifting circuit 3 to frequencies which are higher (or lower) by several tens to several hundreds of hertz. The output of the frequency shifting circuit 3 is applied to a variolosser (level control circuit) 4 to be controlled in its level to a level which is needed for a voice-switched operating in response to the output from a level comparator 6. The level comparator 6 compares the level of a sending voice signal with the level of a receiving voice (speech) signal to output a control signal of variolosser 4 and 11. The controlled output of the variolosser 4 is routed through an output amplifier 5 to a hybrid circuit 8 and, therefrom, to a subscriber line. A balance network 7 is provided to balance the impedance of the hybrid 8.

On the other hand, a receiving speech signal from the subscriber line is amplified by an input amplifier 13 and, then, shifted in its frequency to the frequencies which are higher (or lower) by several tens to several hundreds of hertz by a frequency shifting circuit 12 as the sending voice signal. The output of the frequency shifting circuit 12 is controlled by a variolosser 11 to a level which is needed for the voice-switched operation in response to the output from the level comparator 6, then amplified by a speaker amplifier 10, and then outputted through a speaker 9 as a received voice signal. An amplifier may replace either or both the variolosser 11 or the variolosser circuit 4.

Figure 6:
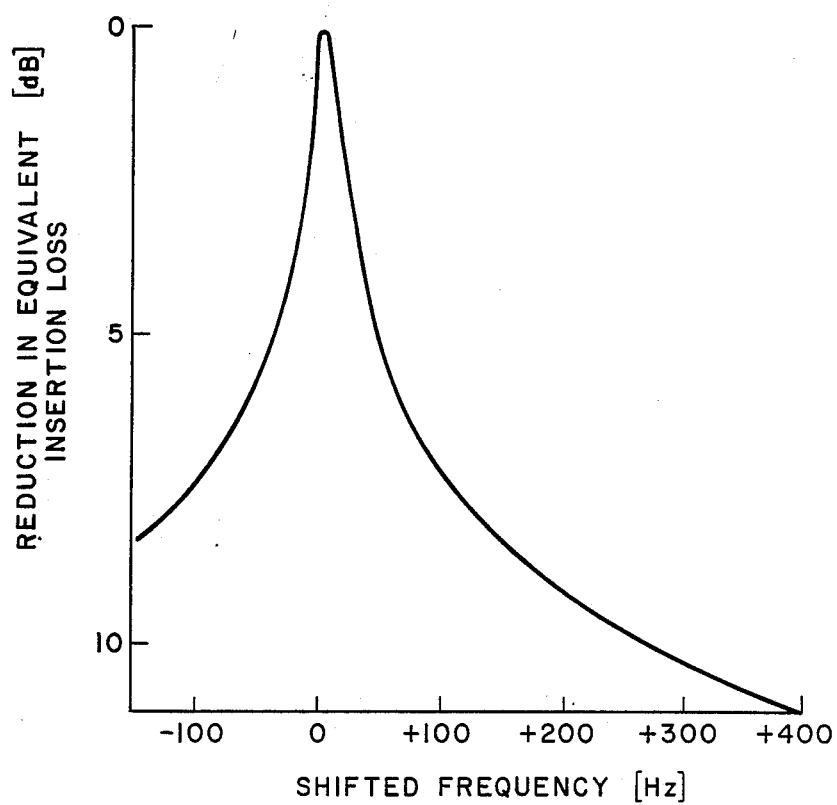
FIG. 6 is a graph showing a relationship between a shifted frequency and a reduction in equivalent insertion loss by actual measurement.

FIG. 6 shows a relationship between the amount of the frequency shift and the reduction in the equivalent insertion loss on one of the transmitting and receiving paths. FIG. 6 was prepared by an actual measurement. As shown, when the amount of the frequency shift is, for example, 100 Hz, the insertion loss can be 7 to 8 dB smaller than it is when the amount of the frequency shift is zero.

The output of the microphone amplifier 2 and the output of the variolosser 11 are fed to a level comparator 6 (FIG. 1) which controls the amount of insertion loss in the variolossers and 11 which are associated with the transmitting and receiving paths, respectively. As discussed with reference to FIG. 6, the amount of the insertion loss introduced by the variolossers 4 and 11 can be reduced by a shift of the frequency, as compared to a prior art voice-switched telephone. This reduction in insertion loss enhances the performance of two-way communication.

As regards to the amount of the frequency shift, several tens of hertz is not very noticeable or unnatural to the auditory sense. Further, even a shift by more than 100 Hz hardly affects the perception. No doubt, the effect of the present invention remains the same even if one of the frequency shifting circuits 3 and 12 which is shown in FIG. 1 is omitted.

Figure 2:
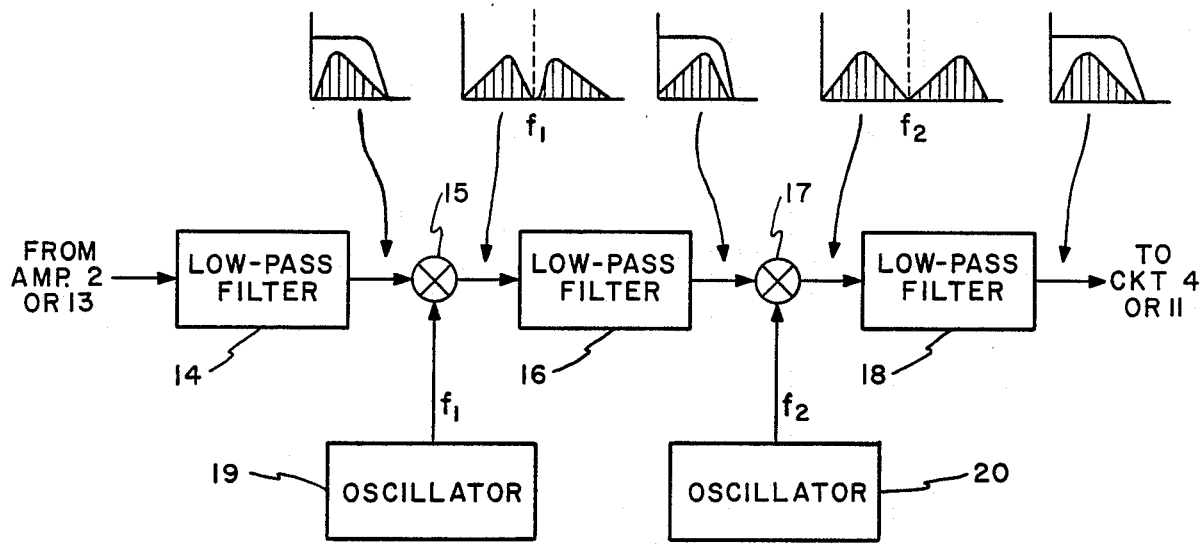
FIG. 2 is a block diagram schematically showing a specific construction of a frequency shifting circuit which is included in the loudspeaking telephone of FIG. 1.

FIG. 2 shows a specific construction of either of the frequency shifting circuits 3 and 12. As shown, a transmitting or receiving path signal from the amplifier 2 or 13 is applied to a low-pass filter 14 having a cut-off frequency of 3.4 kHz. The band-limited output of the low-pass filter 14 and the output of an oscillator 19 are fed to a balanced modulator 15. The balanced modulator 15, therefore, subjects the output frequency f1 of the oscillator 19, e.g., 3.5 kHz, to a balanced modulation. The output of the balanced modulator 15 is routed through a low-pass filter 16 to another balanced modulator 17. This balanced modulator 17 modulates an output frequency $f_2$ fo another oscillator 20, e.g., 3.6 kHz, with the output of low-pass filter 16. The output of the balanced modulator 17 is applied to a low-pass filter 18, resulting in a signal having a frequency that has been shifted by 100 Hz, which is the difference between the frequencies $f_1$ and $f_2$, the output frequency appears on an output terminal of the low-pass filter 18.

Figure 3:
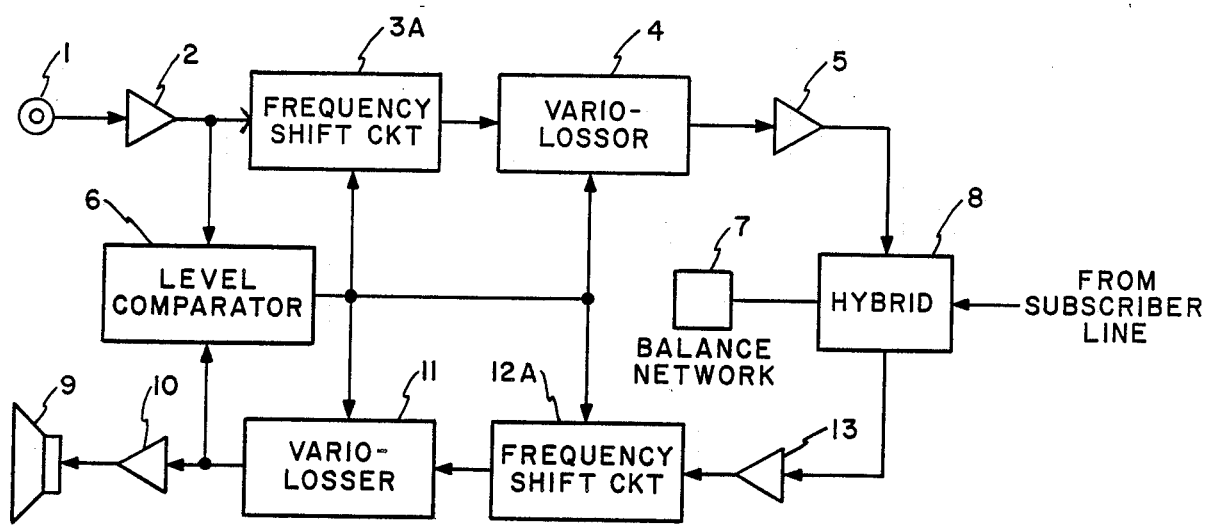
FIG. 3 is a schematic block diagram showing another embodiment of the present invention.

FIG. 3 shows another embodiment of the present invention, in a schematic block diagram. In this particular embodiment, not only the variolossers 4 and 11 but also the frequency shifting circuits 3A and 12A, are controlled by an output of the level comparator 6. The level of comparator 6 of FIG. 3, is the same as the comparator of FIG. 1. In FIG. 3, the level of comparator 6, which is well known in the art, feeds the control signal for the voice switching to the frequency shifting circuits 3A and 12A as well as to the variolosser 4 and 11. In greater detail, the sending voice signal from the microphone 1 is amplified by the microphone amplifier 2 level comparator 6 compares the output level, i.e., a transmitting path signal, with the level of a signal on the receiving path. Assume that the level of the transmitting path signal is higher than the level of the receiving path signal. In such a transmitting condition, the transmitting path signal is not shifted in frequency by the frequency shifting circuit 3. At the same time, the receiving path signal is shifted in its frequency by the frequency shifting circuit 12A to become frequencies which are higher (or lower) by a certain amount lying between several tens and several hundreds of hertz.

Conversely, when the level of the receiving path signal is higher than the level of the transmitting path signal, i.e., in a receiving condition, the frequency in the transmitting path signal is shifted by the frequency shifting circuit 3A to become frequencies which are higher (or lower) by a certain amount lying between several tens and several hundreds of hertz. The receiving path signal is not shifted. Subsequently, the transmitting path signal is controlled by the variolossor 4 to become a level which is needed for the voice-switched operation and, then, is sent over the subscriber line via the output amplifier 5 and hybrid circuit 8. The impedance of the hybrid circuit 8 is balanced by the balance network 7, as stated earlier.

The receiving speech signal from the subscriber line is applied to the frequency shifting circuit 12A by way of the input amplifier 13. The frequency of the receiving path signal is shifted by the frequency shifting circuit 12A when in a transmitting condition and is not shifted when in a receiving condition, as previously described. Thereafter, the output level of the circuit 12A is controlled by the variolossor 11 to a level which is needed for the voice-switched operation, then amplified by the speaker amplifier 10, and then outputted through the speaker 9. The frequency shifting circuits 3A and 12A and the variolossers 4 and 11 are each controlled in response to an output of the level comparator 6.

It is to be noted that the frequency shift does not affect communications at all because it occurs only on the receiving path when in a transmitting condition and only on the transmitting path when in a receiving condition.

Figure 4:
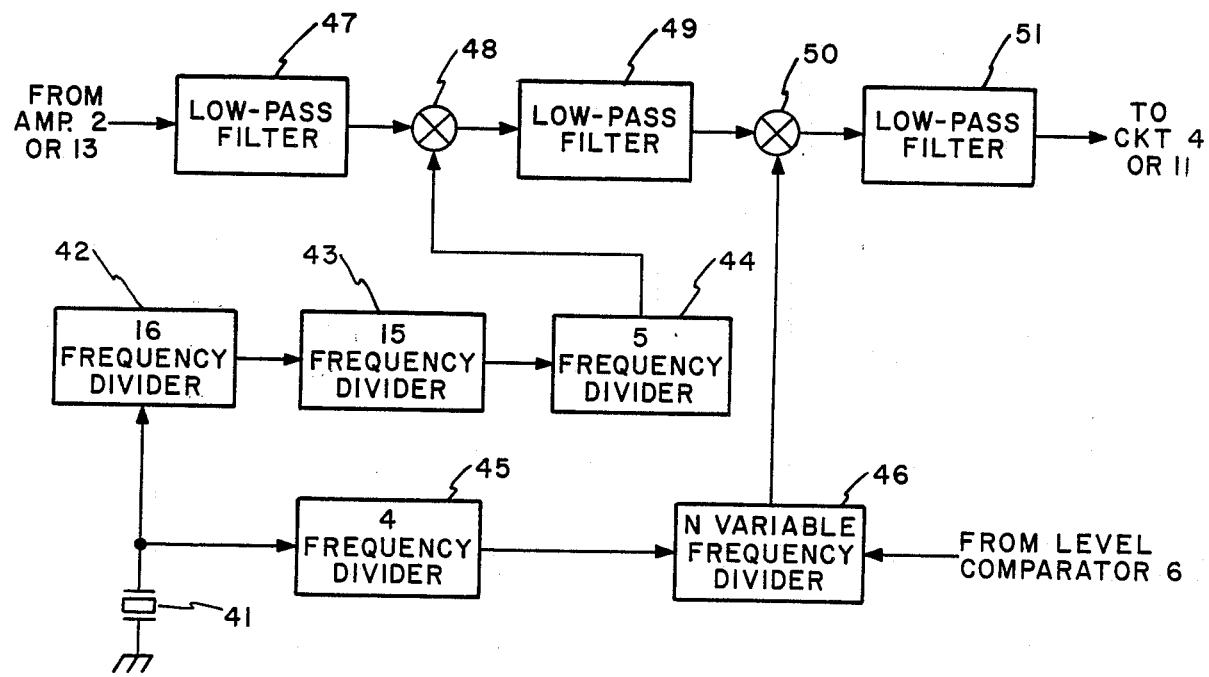
FIGS. 4 and 5 are schematic block diagrams, each showing a different specific example of a frequency shifting circuit of FIG. 3.

Referring to FIG. 4, a specific construction of any of the frequency shifting circuits 3A and 12A is shown. As shown, the frequency shifting circuit 3A or 12A includes a crystal oscillator 41 which oscillates at a frequency of 4.096 MHz. The output of the crystal oscillator 41 is fed to a 16-frequency divider 42 and to a 4-frequency divider 45. The output of the 16-frequency divider 42 is routed to a 5-frequency divider 44 via a 15-frequency divider, a frequency of 3.4 kHz appearing on an output of the frequency divider 44. The 4-frequency divider 45 divides the input frequency, i.e., 4.096 MHz, to produce a frequency of 1024 kHz. The output of the 4-frequency divider 45 is applied to an N variable frequency divider 46. The N variable frequency divider 46, which is well known in the art, divides the output of the divider 45 into; and a frequency which is shifted by several tens to several hundreds of hertz relative to 3.4 kHz. When it is desired to shift the frequency by 100 Hz, N is selected to be 292 and the output is 3.5 kHz. If N is 300, the output is 3.4 kHz, meaning that the frequency is not shifted at all.

In a transmitting condition, for example, the level comparator 6 controls N of the N variable frequency divider 46 to "292" on the receiving path and to "300" on the transmitting path. That is, in a transmitting condition, the level comparator 6 does not shift the transmitting path signal and does shift the receiving path signal by 100 Hz.

The signal outputted by the microphone amplifier 2 is limited to frequencies below 3 kHz by a low-pass filter 47 and, then, modulated by a balanced modulator 48 at 3.4 kHz. The output of the balanced modulator 48 is applied to a low-pass filter 49 so that frequencies thereof which are above 3 kHz are cut off. The output of the low-pass filter 49 is in turn fed to a balanced modulator 50 which modulates a signal of 3.5 kHz with the input thereof. The output frequency of the balanced modulator 50 above 3 kHz is cut off by a low-pass filter 51 resulting in a signal which has been shifted to 100 Hz higher frequencies than the receiving voice is produced.

Figure 5:
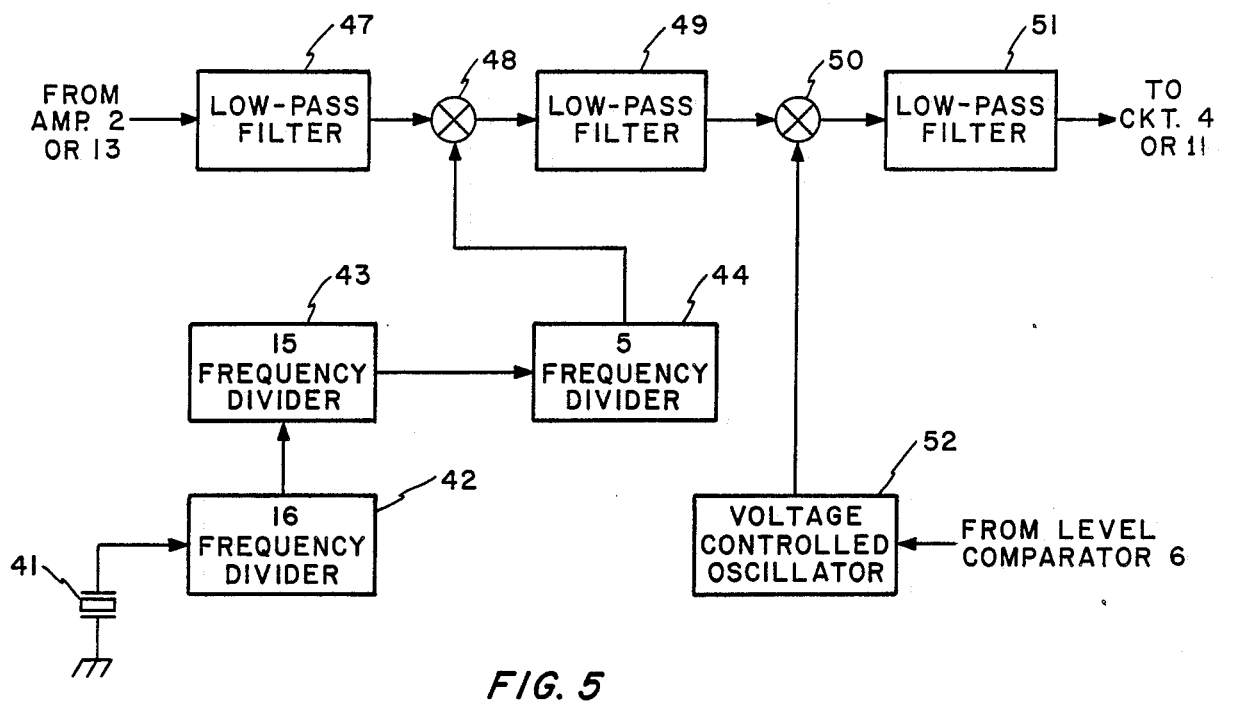

Referring to FIG. 5, another specific construction of the frequency shifting circuit 3A or 12A is shown. As shown, the frequency shift circuit includes a voltage controlled oscillator 52. The voltage controlled oscillator 52 is controlled by the level comparator 6 such that when in a transmitting condition it oscillates at 3.5 kHz on the receiving path and 3.4 kHz on the transmitting path. This frequency relationship will be inverted when the system is in a receiving condition.

The circuitry shown in FIG. 3 may be modified as follows. Assume that the variolossor 11 which serves as a device for setting a volume is so controlled in a receiving condition as to increase the volume by 10 dB. Then, the level comparator 6 maintains the same amount of insertion loss of the variolossor 4 while increasing (or decreasing) the frequency shift as effected by the circuit 3A by an amount which is sufficient to reduce the loss by 10 dB.

In summary, in accordance with the present invention, a frequency shifting circuit is installed on each of a transmitting and receiving paths so as to shift a signal inputted to the associated path in a range of several tens to several hundreds of hertz. Consequently, while a signal is routed through a loop which is defined by the transmitting path, sidetone coupling, receiving path and acoustic coupling in this order, the frequency is brought out of the speech bandwidth and cut off by a low-pass filter. This successfully prevents singing, and the like, on the loop.

The frequency shift does not affect a voice signal because it occurs only on the receiving path when in a transmitting condition and only on the transmitting path when in a receiving condition.

With the above unprecedented advantages, the present invention realizes a simultaneous two-way communication which is superior to those two-way communications which have been after "those"; heretofore attained.

It is to be noted that the present invention is applicable to a mobile radiotelephone without any change or modification except for the replacement of, for example, the subscriber line shown in FIG. 3 with a transmitting and receiving section.

We claim:

1. A voice switched type loudspeaking telephone comprises:

means for comparing the levels of a sending voice signal and a receiving voice signal to produce a level comparison between said levels;
   first frequency shifting means in a transmitting path responsive to said level comparison for frequency-shifting a signal in said transmitting path;
   second frequency shifting means in a receiving path responsive to said level comparison for frequency-shifting a signal in said receiving path;
   first level control means in said transmitting path responsive to said level comparison for level-controlling a signal in said transmitting path; and
   second level control means in said receiving path responsive to said level comparison for level-controlling a signal in said receiving path.

2. A voice switched type loudspeaking telephone comprising:

means for comparing the levels of a sending voice signal and a receiving voice signal to produce a level comparison between said levels;
   transmitting path frequency shifting means in said transmitting path responsive to said level comparison for frequency-shifting a signal in only said transmitting path, if the level of said receiving voice signal is higher than the level of said sending voice signal;
   receiving path frequency shifting means in said receiving path responsive to said level comparison for frequency-shifting the signal in only said receiving path, if the level of said sending voice signal is higher than the level of said receiving voice signal; and
   transmitting path level controlling means in said transmitting path responsive to said level comparison for level-controlling a signal in only said transmitting path, if the level of said receiving voice signal is higher than the level of said sending voice signal; and
   receiving path level controlling means in said receiving path responsive to said level comparison for level-controlling the signal in only said receiving path, if the level of said sending voice signal is higher than the level of said receiving voice signal.

3. A loudspeaking telephone as claimed in claim 2, wherein each of said transmitting path and receiving path frequency shifting means comprises:

an oscillator for producing a signal oscillating at a predetermined frequency;
   first filter means for limiting said transmitting and receiving path signals with respect to their frequency bandwidth;
   first frequency divider means for dividing said predetermined frequency from said oscillator by a predetermined number in order to produce an output;
   first balanced modulator means for balance-modulating an output of said first filter means by said output of said first frequency divider means;
   second filter means for limiting an output of said first balanced modulator means with respect to a frequency band in order to produce an output;
   variable frequency divider means for dividing said predetermined frequency from said oscillator based on said level comparison;
   second balanced modulator means for balance-modulating said output of said second filter means by an output of said variable frequency divider means; and third filter means for limiting an output of said second balanced modulator means with respect to a frequency bandwidth in order to output said voice signals.

4. A loudspeaking telephone as claimed in claim 2, wherein each of said transmitting path and said receiving path frequency shifting means comprises:

an oscillator for producing a signal oscillating at a predetermined frequency;

first filter means for limiting said transmitting and receiving path signals with respect to their frequency bandwidth;

first frequency divider means for dividing said predetermined frequency from said oscillator by a predetermined number in order to produce an output;

first balanced modulator means for balance-modulating an output of said first filter means by said output of said first frequency divider means;

second filter means for limiting an output of said first balanced modulator means with respect to a frequency band in order to produce an output;

voltage controlled oscillator means for producing a signal oscillating at a frequency which is associated with said level comparison;

second balanced modulator means for balance-modulating said output of said second filter means by an output of said voltage controlled oscillator means; and third filter means for limiting an output of second balanced modulator means with respect to a frequency band in order to produce a frequency-shifted signal of said transmitting and receiving path signals.

* * * * *